(12) United States Patent
Sathyamurthy et al.

(10) Patent No.: US 9,747,136 B2
(45) Date of Patent: Aug. 29, 2017

(54) METHODS AND SYSTEMS THAT ALLOCATE COST OF CLUSTER RESOURCES IN VIRTUAL DATA CENTERS

(71) Applicant: VMWARE, INC., Palo Alto, CA (US)

(72) Inventors: Dattathreya Sathyamurthy, Bangalore (IN); Kumar Gaurav, Bangalore (IN); Piyush Bharat Masrani, Bangalore (IN); Hemanth Kumar Pannem, Bangalore (IN); Chintesh Pulavarthi, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/619,071

(22) Filed: Feb. 11, 2015

(65) Prior Publication Data

US 2016/0162338 A1    Jun. 9, 2016

(30) Foreign Application Priority Data

Dec. 9, 2014 (IN) .......................... 6215/CHE/2014

(51) Int. Cl.
*G06F 9/50* (2006.01)
*G06F 9/455* (2006.01)
*G06Q 30/04* (2012.01)
*H04L 12/911* (2013.01)

(52) U.S. Cl.
CPC ........ *G06F 9/5077* (2013.01); *G06F 9/45558* (2013.01); *G06Q 30/04* (2013.01); *G06F 9/455* (2013.01); *G06F 9/50* (2013.01); *G06F 9/5027* (2013.01); *G06F 9/5072* (2013.01); *G06F 2009/4557* (2013.01); *G06F 2009/45595* (2013.01); *H04L 47/821* (2013.01); *H04L 47/823* (2013.01)

(58) Field of Classification Search
None
See application file for complete search history.

(56) References Cited

U.S. PATENT DOCUMENTS

| | | | | |
|---|---|---|---|---|
| 7,499,968 B1 * | 3/2009 | Alexander | ............. | G06Q 10/06 705/412 |
| 8,782,211 B1 * | 7/2014 | Sharma | ............... | H04L 67/1036 709/224 |
| 9,053,167 B1 * | 6/2015 | Swift | ................. | G06F 17/30584 |
| 9,189,361 B2 * | 11/2015 | Khatutsky | ........... | G06F 11/3409 |
| 9,354,937 B2 * | 5/2016 | Habdank | ................. | G06F 9/505 |
| 2005/0044228 A1 * | 2/2005 | Birkestrand | .......... | G06F 9/5072 709/226 |
| 2006/0265470 A1 * | 11/2006 | Rolia | ..................... | G06F 9/5027 709/217 |
| 2007/0233843 A1 * | 10/2007 | Frey-Ganzel | ......... | G06F 9/5083 709/223 |
| 2009/0183168 A1 * | 7/2009 | Uchida | ................. | G06F 9/5027 718/104 |

(Continued)

*Primary Examiner* — Abu Ghaffari

(57) ABSTRACT

This disclosure presents computational systems and methods that allocate cost of resources of a cluster of server computers used by virtual machines in a virtual data center. In one aspect, a fair unit rate is computed based on the larger of a measured average utilization or an expected utilization of a cluster resource of server computers within a physical data center by virtual machines. The fair unit rate is a cost per unit of resource used over a period of time and is used to compute an allocated cost of the virtual machine usage of the cluster resource.

15 Claims, 19 Drawing Sheets

(56) References Cited

U.S. PATENT DOCUMENTS

| | | | |
|---|---|---|---|
| 2011/0302578 A1* | 12/2011 | Isci | G06F 9/5077 |
| | | | 718/1 |
| 2013/0031550 A1* | 1/2013 | Choudhury | G06F 9/45558 |
| | | | 718/1 |
| 2013/0031559 A1* | 1/2013 | Alicherry | G06F 9/5077 |
| | | | 718/104 |
| 2013/0283266 A1* | 10/2013 | Baset | G06F 9/485 |
| | | | 718/1 |
| 2013/0304903 A1* | 11/2013 | Mick | H04L 43/0817 |
| | | | 709/224 |
| 2014/0237472 A1* | 8/2014 | Adogla | G06F 9/5077 |
| | | | 718/1 |
| 2015/0286502 A1* | 10/2015 | Jackson | G06F 9/5027 |
| | | | 718/104 |

* cited by examiner

METHODS AND SYSTEMS THAT ALLOCATE COST OF CLUSTER RESOURCES IN VIRTUAL DATA CENTERS

TECHNICAL FIELD

The present disclosure is directed to methods and system of allocating cost of resources in virtual data centers.

BACKGROUND

In recent years, enterprises have shifted much of their computing needs from localized computer systems to cloud computing providers. Cloud computing providers charge enterprises to store and run their applications and allow enterprises to purchase other computing services in much the same way utility customers purchase a service from a public utility. Cloud computing providers manage and maintain cloud computing facilities composed of servers, switches, routers, and mass data-storage devices interconnected by local-area networks, wide-area networks, wireless communications, and the Internet that may be distributed geographically or consolidated into data centers. Enterprises typically run their applications as virtual machines ("VMs") in a cloud computing facility. A cloud computing provider typically provides an enterprise one or more virtual data centers ("VDCs"), each VDC composed of the enterprise's VMs. A VDC recreates the architecture and functionality of a physical data center for running an enterprise's VMs.

In a typical cloud computing facility, an enterprise's VMs typically share the same set of physical resources across a number server computers or hosts. In order to maximize resource utilization and profits, an IT manager may choose to provision more VMs than the physical capacity of the resources because not all of an enterprises VMs are expected to use all of the resources at the same time. This practice of provisioning more VMs than the capacity of the resources is called "over-commit" or "over-provision." On the other hand, an IT manager may provision an enterprise's VMs with a plan to utilize less than the capacity of the resources. This practice is called "under-commit" or "under-provision" which is often used with enterprise VMs that have a fairly constant average resource utilization but need additional room for peak workloads from time to time. Service providers typically operate in a mix of over-commit or under-commit of VMs.

From a financial standpoint, it is important that unit rates of resources, such as cost per GHz for processors and cost per GB for memory and storage, can be used by enterprises in budgeting, planning, and show-back cost of VMs to their departments and enable cloud computing providers to determine a price for using their resources. When resource provisioning exactly matches the computational requirements of an enterprise's VMs, a unit rate may be the cost of the resource divided by the total capacity of the resource. However, it is uncommon for service providers to provision resources to exactly match the computational requirements of an enterprise's VMs in situations where resources are either under-committed or over-committed.

SUMMARY

This disclosure presents computational systems and methods that allocate cost of resources of a cluster of server computers used by virtual machines in a virtual data center. In one aspect, a fair unit rate is computed based on the larger of a measured average utilization or an expected utilization of a cluster resource of server computers within a physical data center by virtual machines. The fair unit rate is a cost per unit of resource used over a period of time and is used to compute an allocated cost of the virtual machine usage of the cluster resource. The fair unit rates may be used to compute costs when resources are either under-committed or over-committed and may be used to assess actual cost of VMs and determine a price to charge enterprises that purchase cloud computing services.

DETAILED DESCRIPTION

Figure 1:
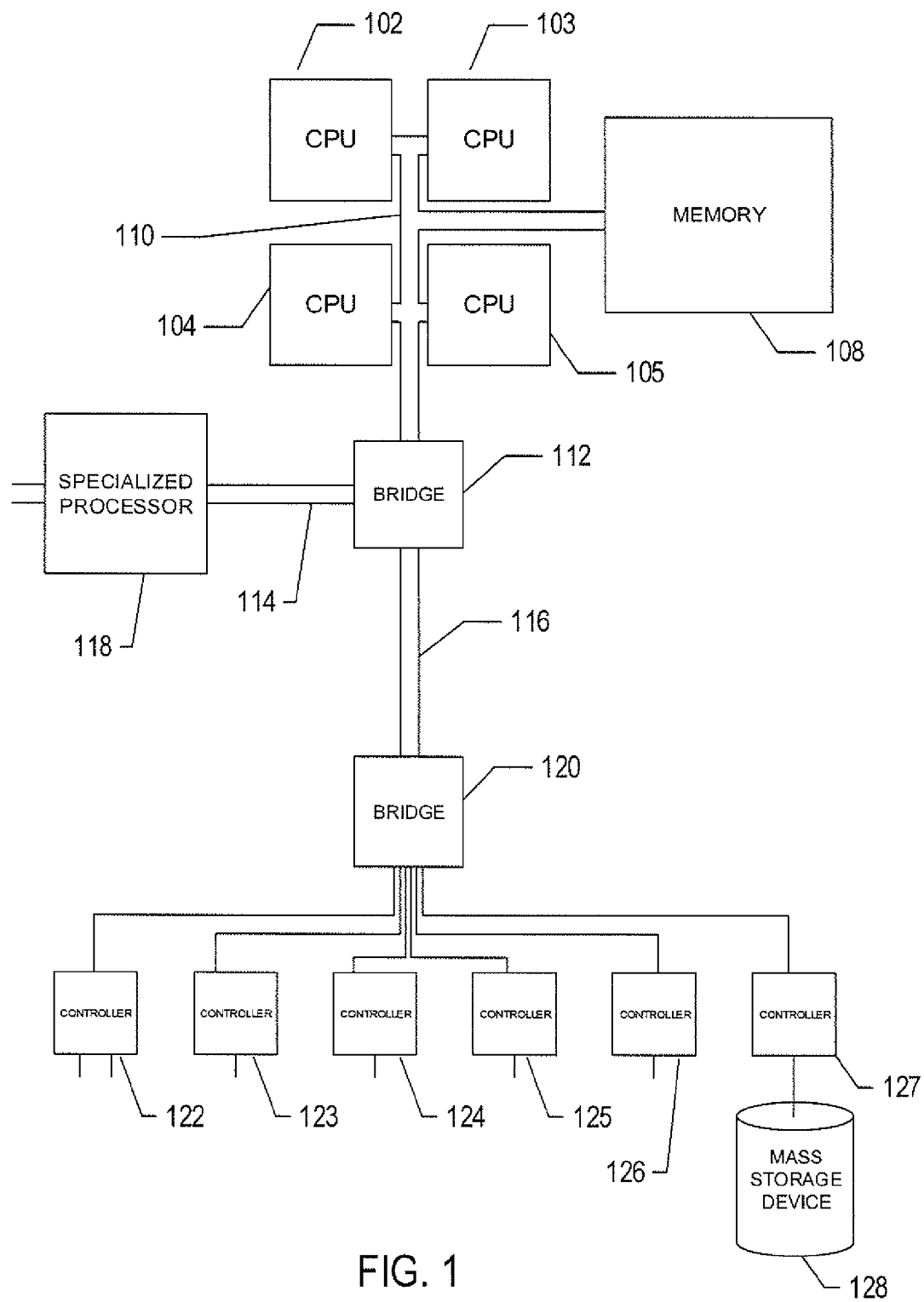
FIG. 1 shows a general architectural diagram for various types of computers.

In a first subsection a detailed description of computer hardware, complex computational systems, and virtualization is provided with reference to FIGS. 1-10. In a second subsection, implementations of currently disclosed methods and systems that allocate cost of cluster resources to virtual data centers are discussed with reference to FIGS. 11-18.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 shows a general architectural diagram for various types of computers. Computers that receive, process, and store event messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational devices. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
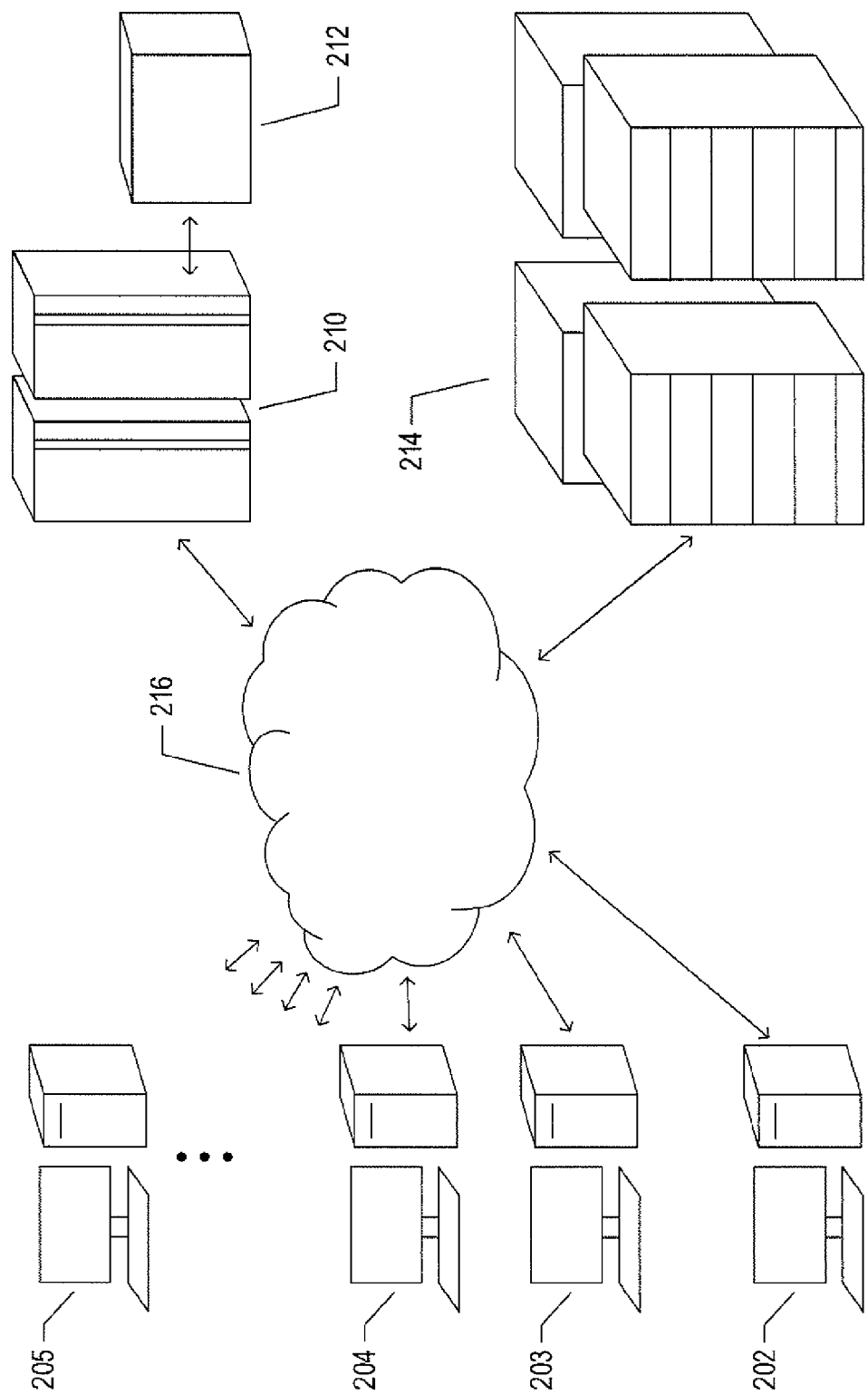
FIG. 2 shows an Internet-connected distributed computer system.

FIG. 2 shows an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
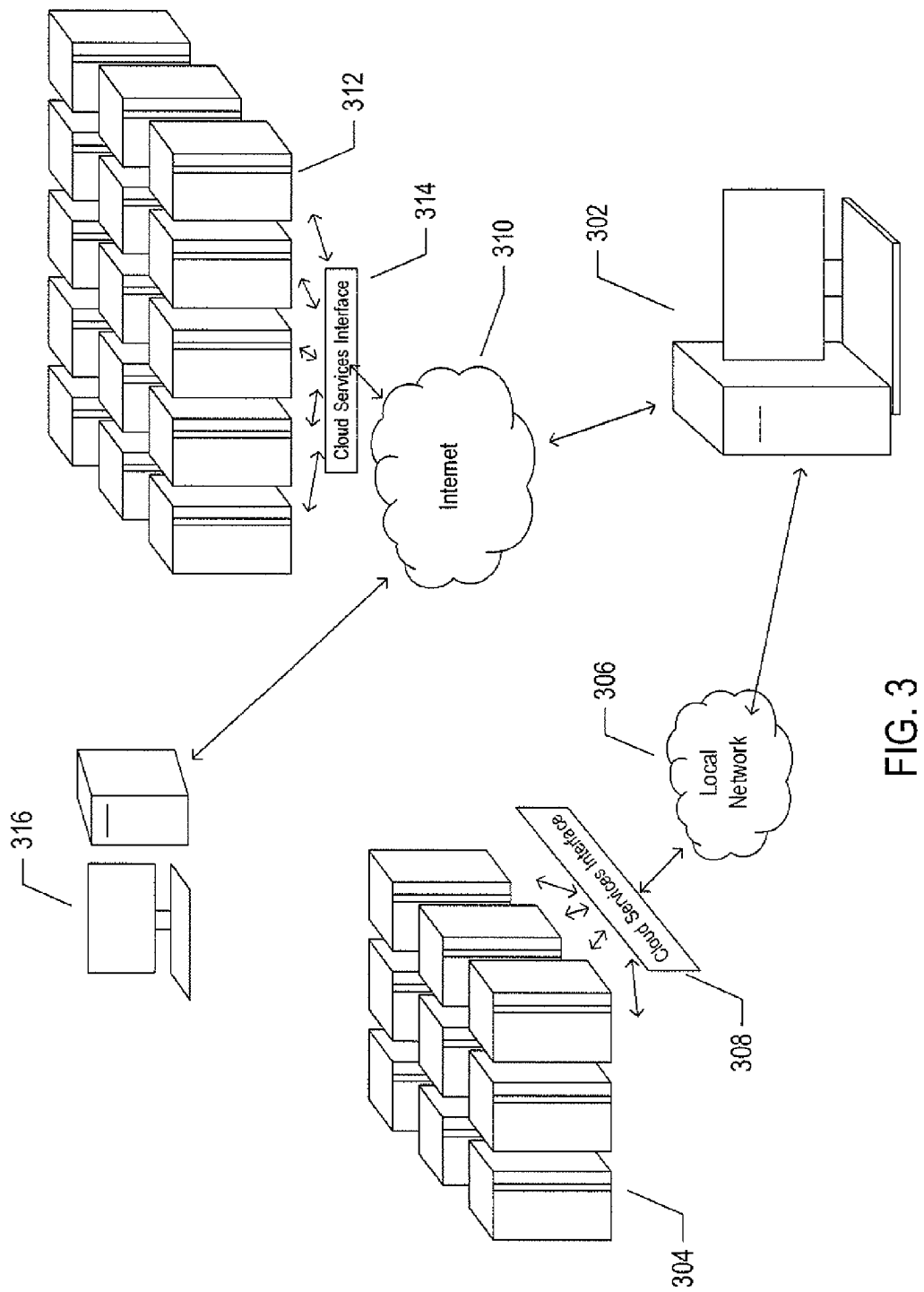
FIG. 3 shows cloud computing.

FIG. 3 shows cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the devices to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
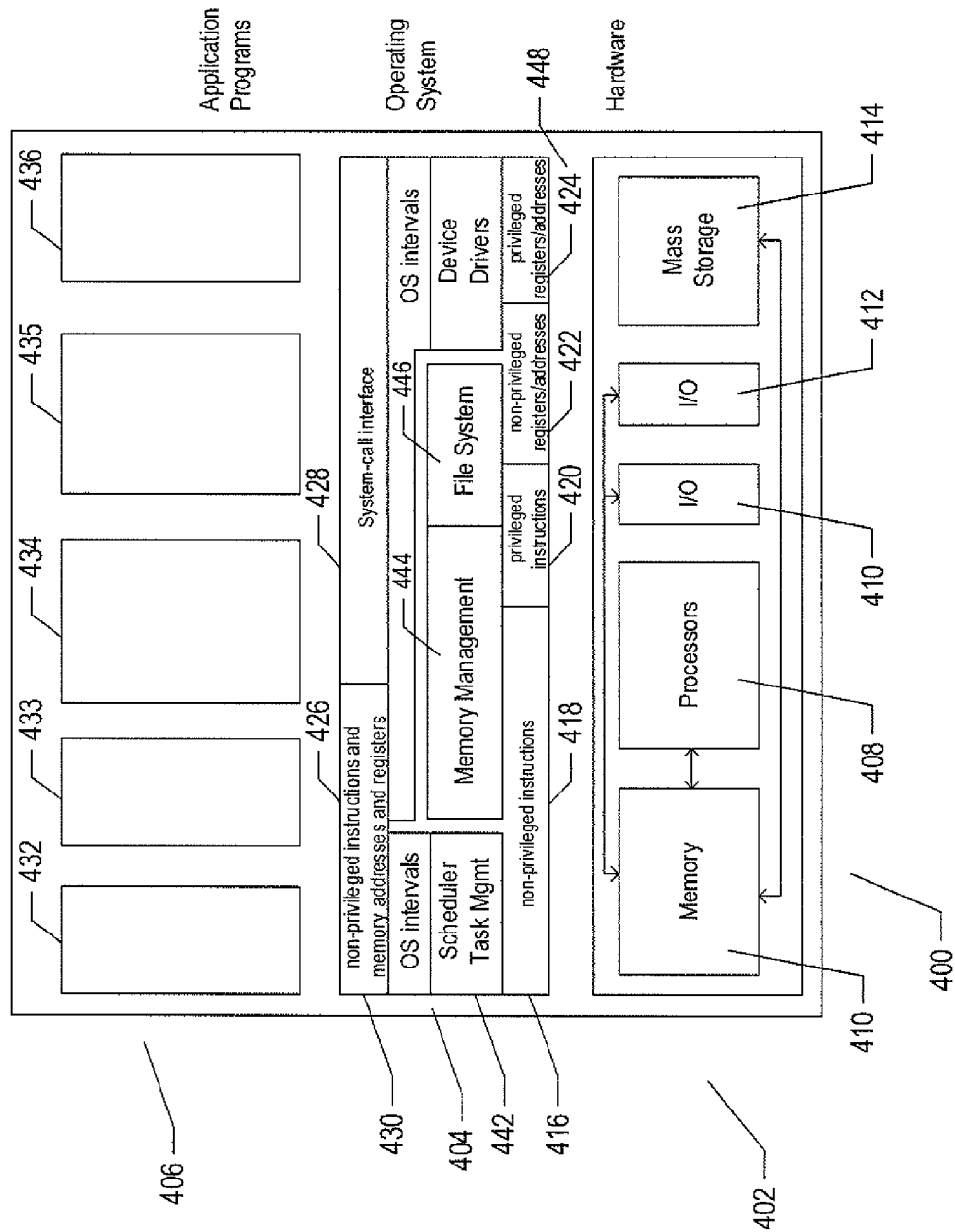
FIG. 4 shows generalized hardware and software components of a general-purpose computer system.

FIG. 4 shows generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor devices and other system devices with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory devices as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
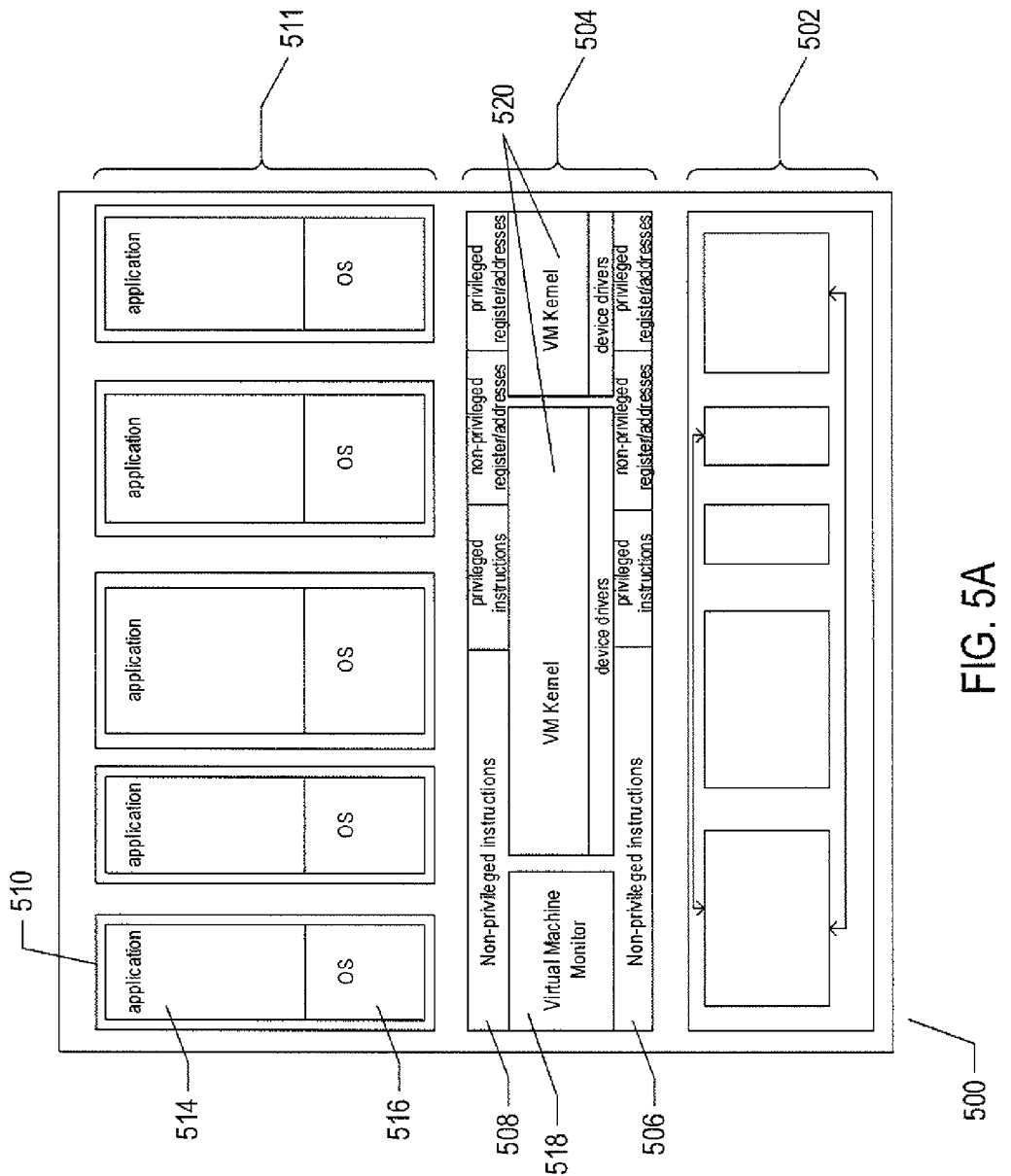
FIGS. 5A-5B show two types of virtual machine and virtual-machine execution environments.
Figure 5B:
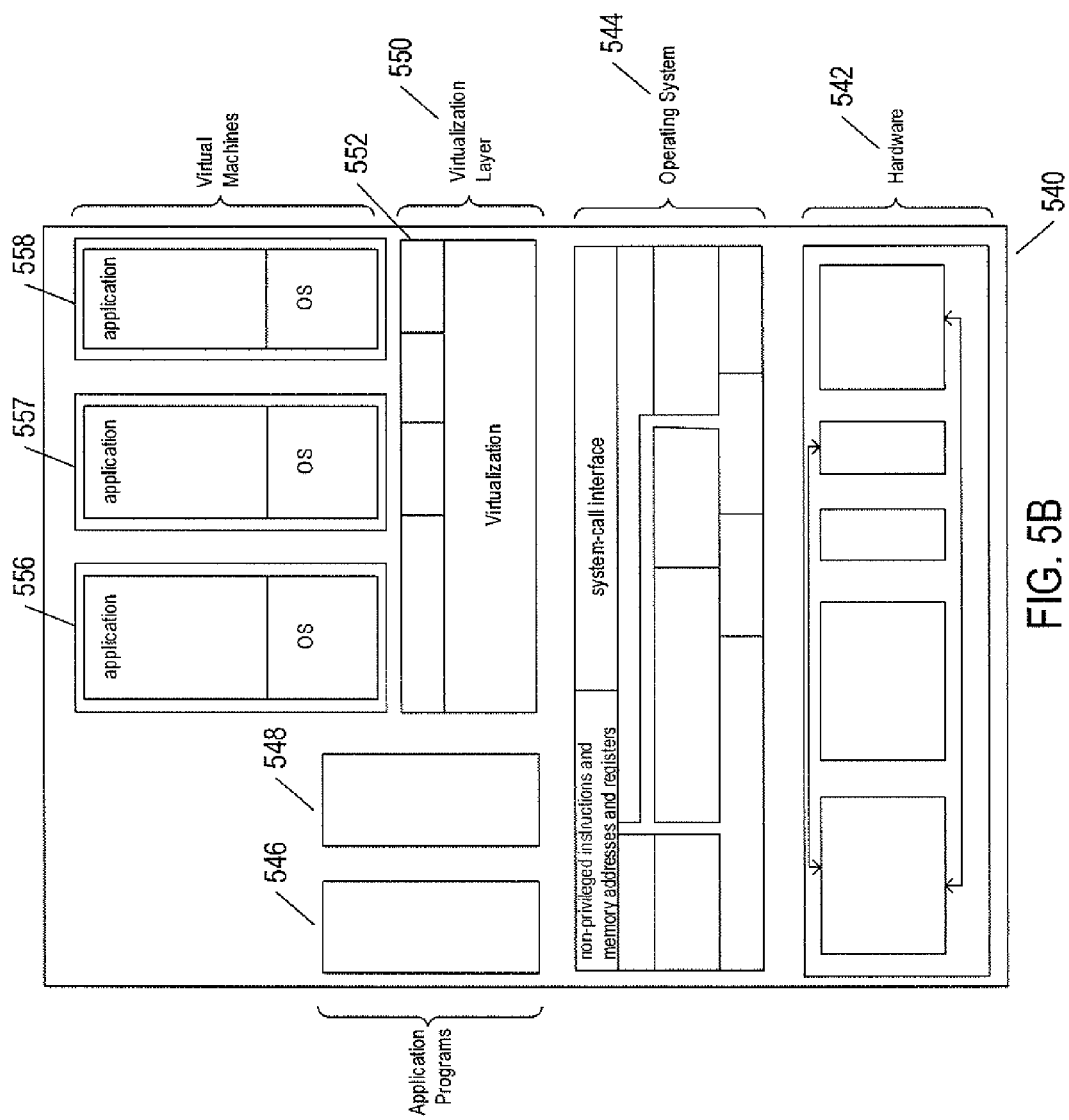

For all of these reasons, a higher level of abstraction, referred to as the "virtual machine," ("VM") has been developed and evolved to further abstract computer hardware in order to address many difficulties and challenges associated with traditional computing systems, including the compatibility issues discussed above. FIGS. 5A-B show two types of VM and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment shown in FIG. 5A features a virtualization layer 504 that interfaces through a virtualization-layer/hardware-layer interface 506, equivalent to interface 416 in FIG. 4, to the hardware. The virtualization layer 504 provides a hardware-like interface 508 to a number of VMs, such as VM 510, in a virtual-machine layer 511 executing above the virtualization layer 504. Each VM includes one or more application programs or other higher-level computational entities packaged together with an operating system, referred to as a "guest operating system," such as application 514 and guest operating system 516 packaged together within VM 510. Each VM is thus equivalent to the operating-system layer 404 and application-program layer 406 in the general-purpose computer system shown in FIG. 4. Each guest operating system within a VM interfaces to the virtualization-layer interface 508 rather than to the actual hardware interface 506. The virtualization layer 504 partitions hardware devices into abstract virtual-hardware layers to which each guest operating system within a VM interfaces. The guest operating systems within the VMs, in general, are unaware of the virtualization layer and operate as if they were directly accessing a true hardware interface. The virtualization layer 504 ensures that each of the VMs currently executing within the virtual environment receive a fair allocation of underlying hardware devices and that all VMs receive sufficient devices to progress in execution. The virtualization-layer interface 508 may differ for different guest operating systems. For example, the virtualization layer is generally able to provide virtual hardware interfaces for a variety of different types of computer hardware. This allows, as one example, a VM that includes a guest operating system designed for a particular computer architecture to run on hardware of a different architecture. The number of VMs need not be equal to the number of physical processors or even a multiple of the number of processors.

The virtualization layer 504 includes a virtual-machine-monitor module 518 ("VMM") that virtualizes physical processors in the hardware layer to create virtual processors on which each of the VMs executes. For execution efficiency, the virtualization layer attempts to allow VMs to directly execute non-privileged instructions and to directly access non-privileged registers and memory. However, when the guest operating system within a VM accesses virtual privileged instructions, virtual privileged registers, and virtual privileged memory through the virtualization-layer interface 508, the accesses result in execution of virtualization-layer code to simulate or emulate the privileged devices. The virtualization layer additionally includes a kernel module 520 that manages memory, communications, and data-storage machine devices on behalf of executing VMs ("VM kernel"). The VM kernel, for example, maintains shadow page tables on each VM so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer 504 essentially schedules execution of VMs much like an operating system schedules execution of application programs, so that the VMs each execute within a complete and fully functional virtual hardware layer.

FIG. 5B shows a second type of virtualization. In FIG. 5B, the computer system 540 includes the same hardware layer 542 and operating system layer 544 as the hardware layer 402 and the operating system layer 404 shown in FIG. 4. Several application programs 546 and 548 are shown running in the execution environment provided by the operating system 544. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of VMs 556-558, each including one or more application programs or other higher-level computational entities packaged together with a guest operating system.

In FIGS. 5A-5B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
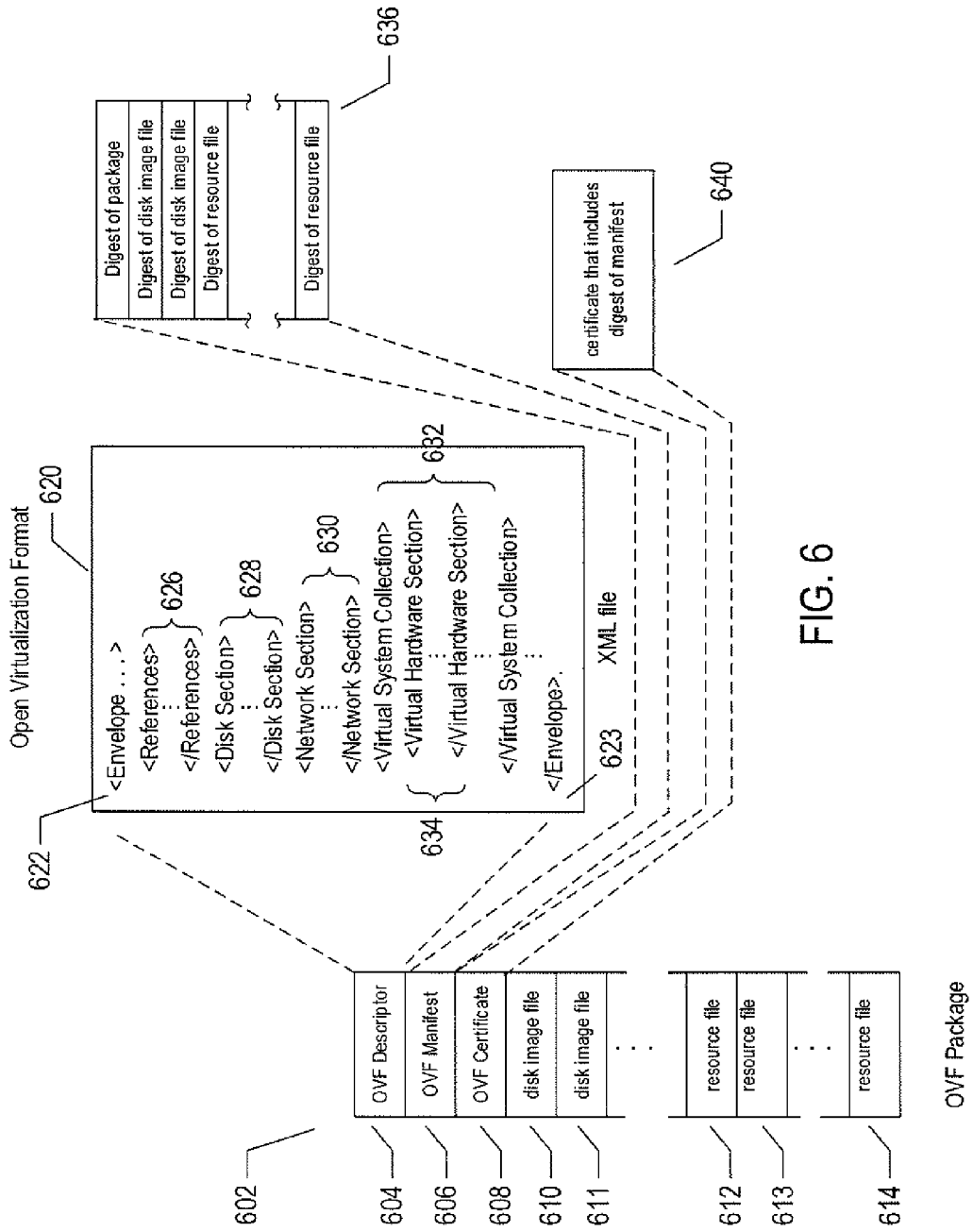
FIG. 6 shows an example of an open virtualization format package.

A VM or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a VM within one or more data files. FIG. 6 shows an OVF package. An OVF package 602 includes an OVF descriptor 604, an OVF manifest 606, an OVF certificate 608, one or more disk-image files 610-611, and one or more device files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each VM 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and device files 612 are digitally encoded content, such as operating-system images. A VM or a collection of VMs encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more VMs that is encoded within an OVF package.

The advent of VMs and virtual environments has alleviated many of the difficulties and challenges associated with traditional general-purpose computing. Machine and operating-system dependencies can be significantly reduced or entirely eliminated by packaging applications and operating systems together as VMs and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers.

Figure 7:
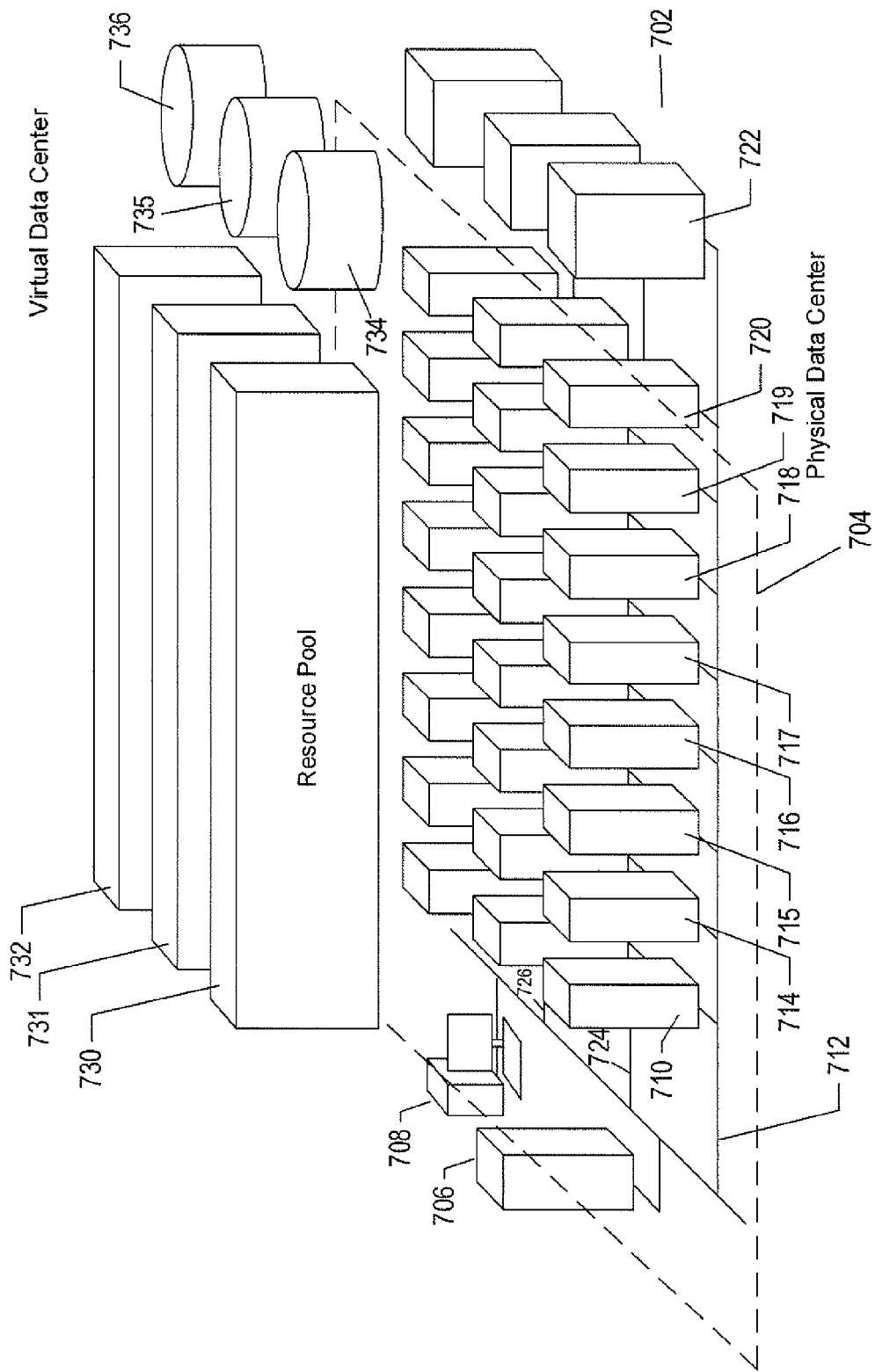
FIG. 7 shows virtual data centers provided as an abstraction of underlying physical-data-center hardware components.

FIG. 7 shows virtual data centers provided as an abstraction of underlying physical-data-center hardware components. In FIG. 7, a physical data center 702 is shown below a virtual-interface plane 704. The physical data center consists of a virtual-data-center management server 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple VMs. Different physical data centers may include many different types of computers, networks, data-storage systems and devices connected according to many different types of connection topologies. The virtual-interface plane 704, a logical abstraction layer shown by a plane in FIG. 7, abstracts the physical data center to a virtual data center comprising one or more device pools, such as device pools 730-732, one or more virtual data stores, such as virtual data stores 734-736, and one or more virtual networks. In certain implementations, the device pools abstract banks of physical servers directly interconnected by a local area network.

The virtual-data-center management interface allows provisioning and launching of VMs with respect to device pools, virtual data stores, and virtual networks, so that virtual-data-center administrators need not be concerned with the identities of physical-data-center components used to execute particular VMs. Furthermore, the virtual-data-center management server 706 includes functionality to migrate running VMs from one physical server to another in order to optimally or near optimally manage device allocation, provide fault tolerance, and high availability by migrating VMs to most effectively utilize underlying physical hardware devices, to replace VMs disabled by physical hardware problems and failures, and to ensure that multiple VMs supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of VMs and virtual appliances as well as to provide high-level, distributed functionalities that involve pooling the devices of individual physical servers and migrating VMs among physical servers to achieve load balancing, fault tolerance, and high availability.

Figure 8:
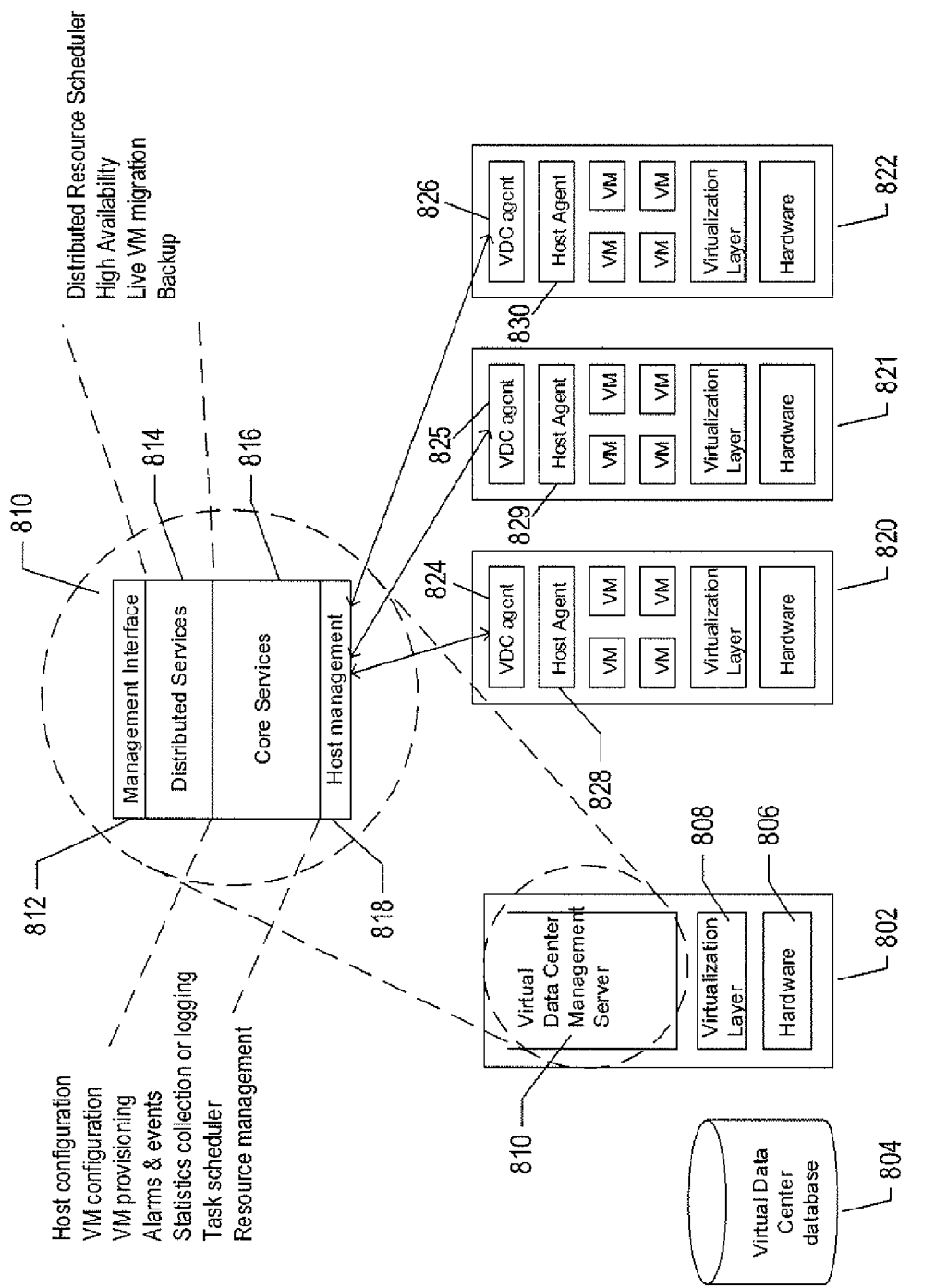
FIG. 8 shows virtual-machine components of a virtual-data-center management server and physical servers of a physical data center.

FIG. 8 shows virtual-machine components of a virtual-data-center management server and physical servers of a physical data center above which a virtual-data-center interface is provided by the virtual-data-center management server. The virtual-data-center management server 802 and a virtual-data-center database 804 comprise the physical components of the management component of the virtual data center. The virtual-data-center management server 802 includes a hardware layer 806 and virtualization layer 808, and runs a virtual-data-center management-server VM 810 above the virtualization layer. Although shown as a single server in FIG. 8, the virtual-data-center management server ("VDC management server") may include two or more physical server computers that support multiple VDC-management-server virtual appliances. The VM 810 includes a management-interface component 812, distributed services 814, core services 816, and a host-management interface 818. The management interface 818 is accessed from any of various computers, such as the PC 708 shown in FIG. 7. The management interface 818 allows the virtual-data-center administrator to configure a virtual data center, provision VMs, collect statistics and view log files for the virtual data center, and to carry out other, similar management tasks. The host-management interface 818 interfaces to virtual-data-center agents 824, 825, and 826 that execute as VMs within each of the physical servers of the physical data center that is abstracted to a virtual data center by the VDC management server.

The distributed services 814 include a distributed-device scheduler that assigns VMs to execute within particular physical servers and that migrates VMs in order to most effectively make use of computational bandwidths, data-storage capacities, and network capacities of the physical data center. The distributed services 814 further include a high-availability service that replicates and migrates VMs in order to ensure that VMs continue to execute despite problems and failures experienced by physical hardware components. The distributed services 814 also include a live-virtual-machine migration service that temporarily halts execution of a VM, encapsulates the VM in an OVF package, transmits the OVF package to a different physical server, and restarts the VM on the different physical server from a virtual-machine state recorded when execution of the VM was halted. The distributed services 814 also include a distributed backup service that provides centralized virtual-machine backup and restore.

The core services 816 provided by the VDC management server 810 include host configuration, virtual-machine configuration, virtual-machine provisioning, generation of virtual-data-center alarms and events, ongoing event logging and statistics collection, a task scheduler, and a device-management module. Each physical server 820-822 also includes a host-agent VM 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce device allocations made by the VDC management server 810, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational devices of a cloud-computing facility to cloud-computing-infrastructure users. A cloud-director management server exposes virtual devices of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
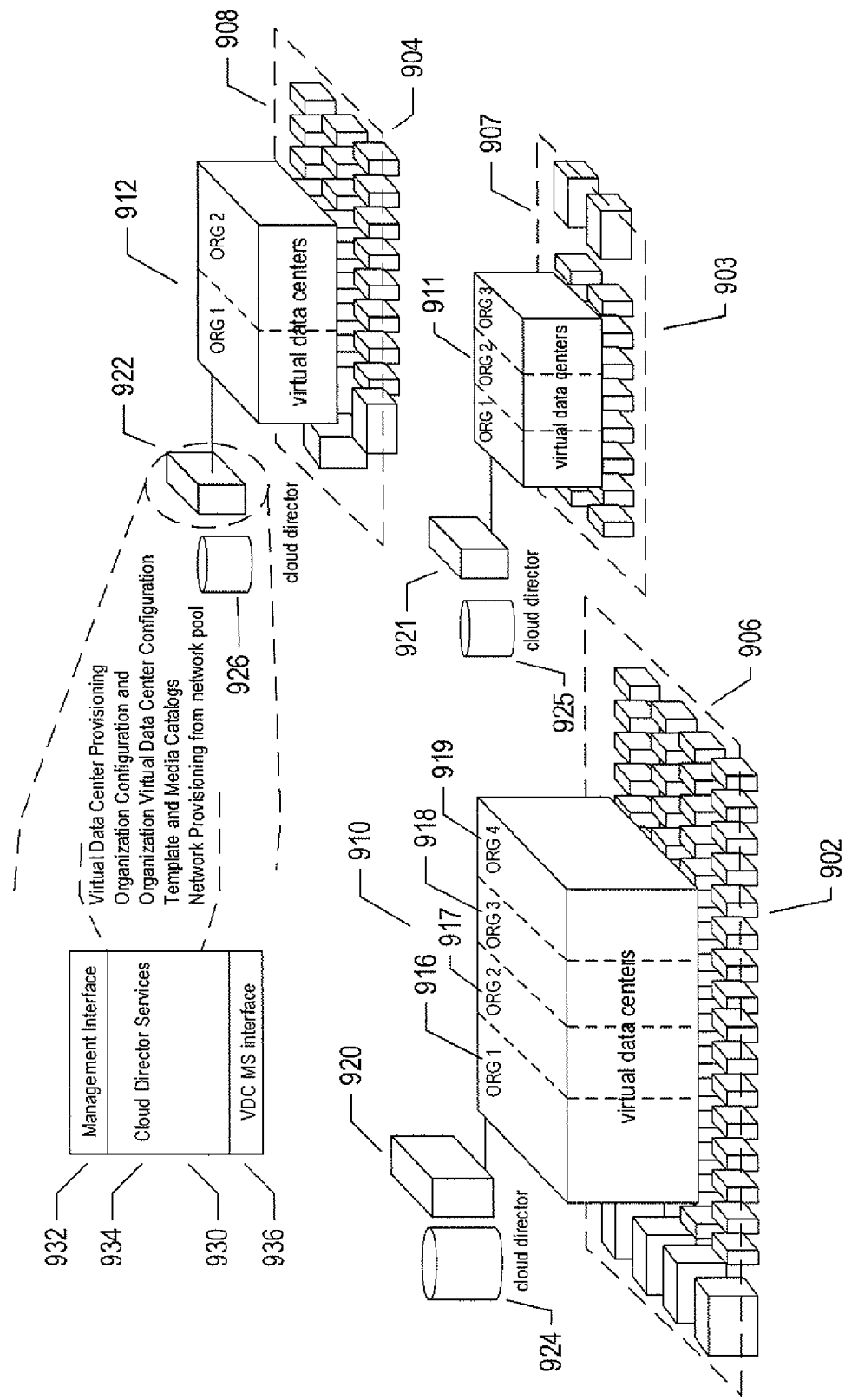
FIG. 9 shows a cloud-director level of abstraction.

FIG. 9 shows a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The devices of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are VMs that each contains an OS and/or one or more VMs containing applications. A template may include much of the detailed contents of VMs and virtual appliances that are encoded within OVF packages, so that the task of configuring a VM or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
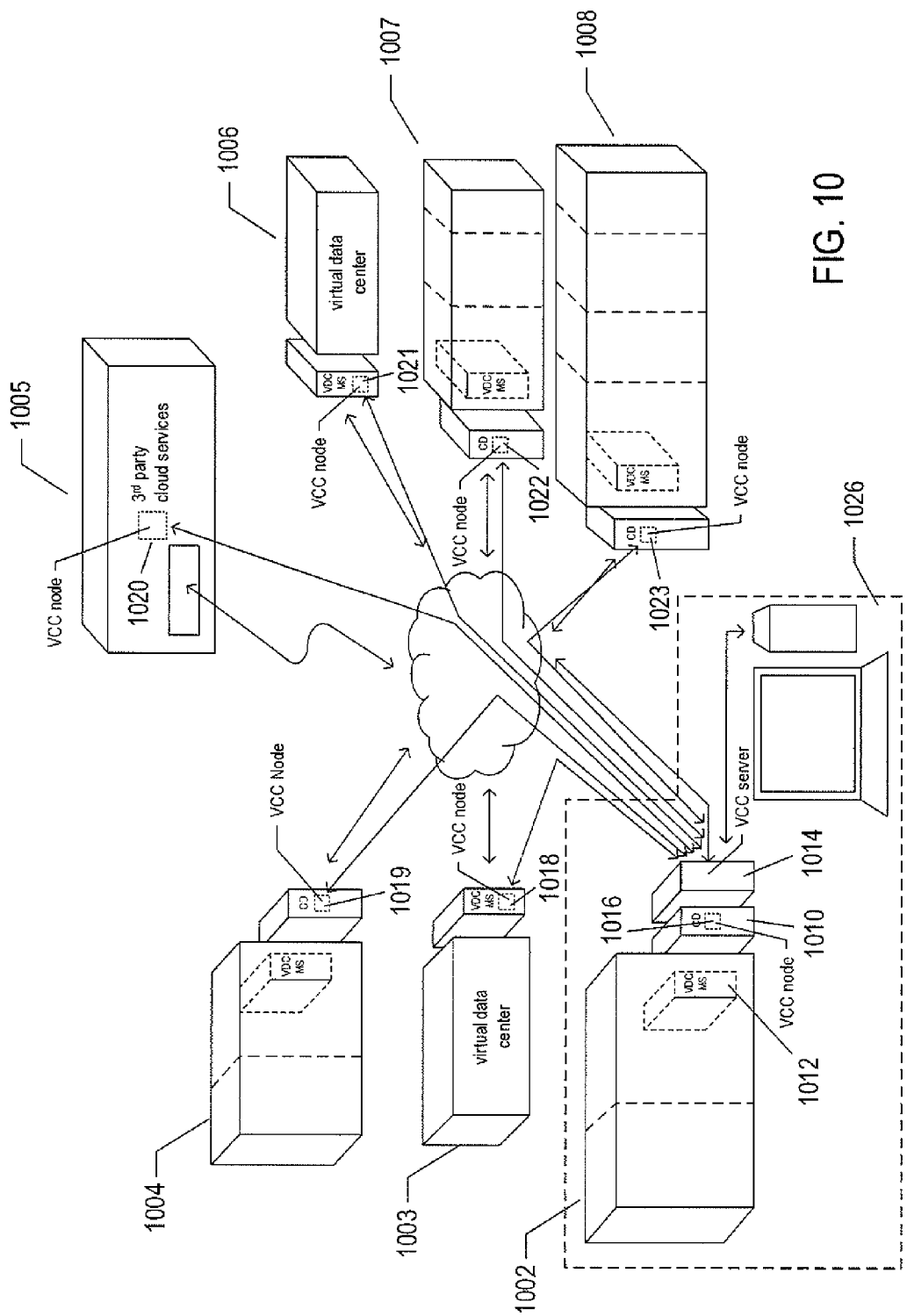
FIG. 10 shows virtual-cloud-connector nodes.

FIG. 10 shows virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are shown 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Figure 11A:
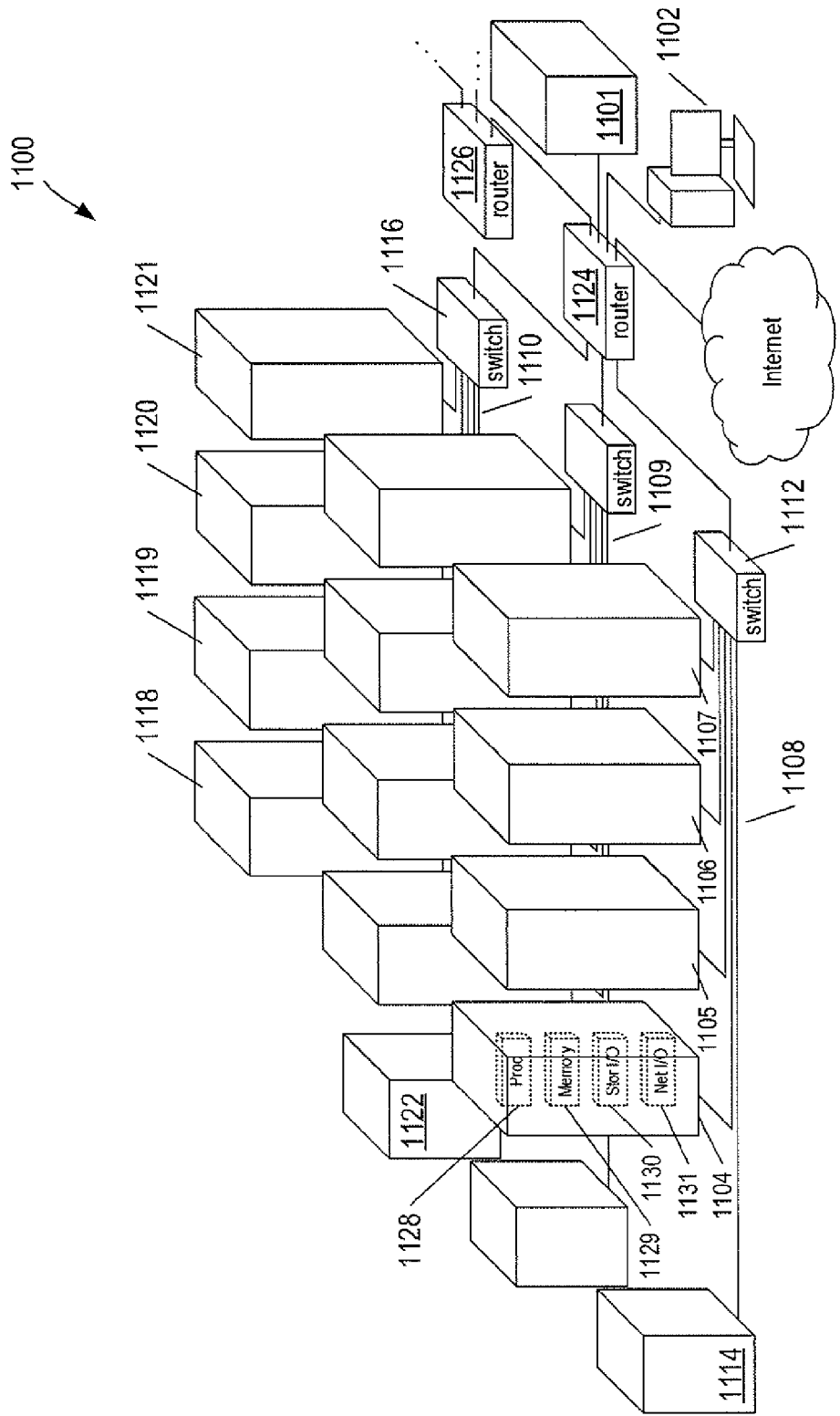
FIG. 11A-B shows an example portion of a physical data center.
Figure 11B:
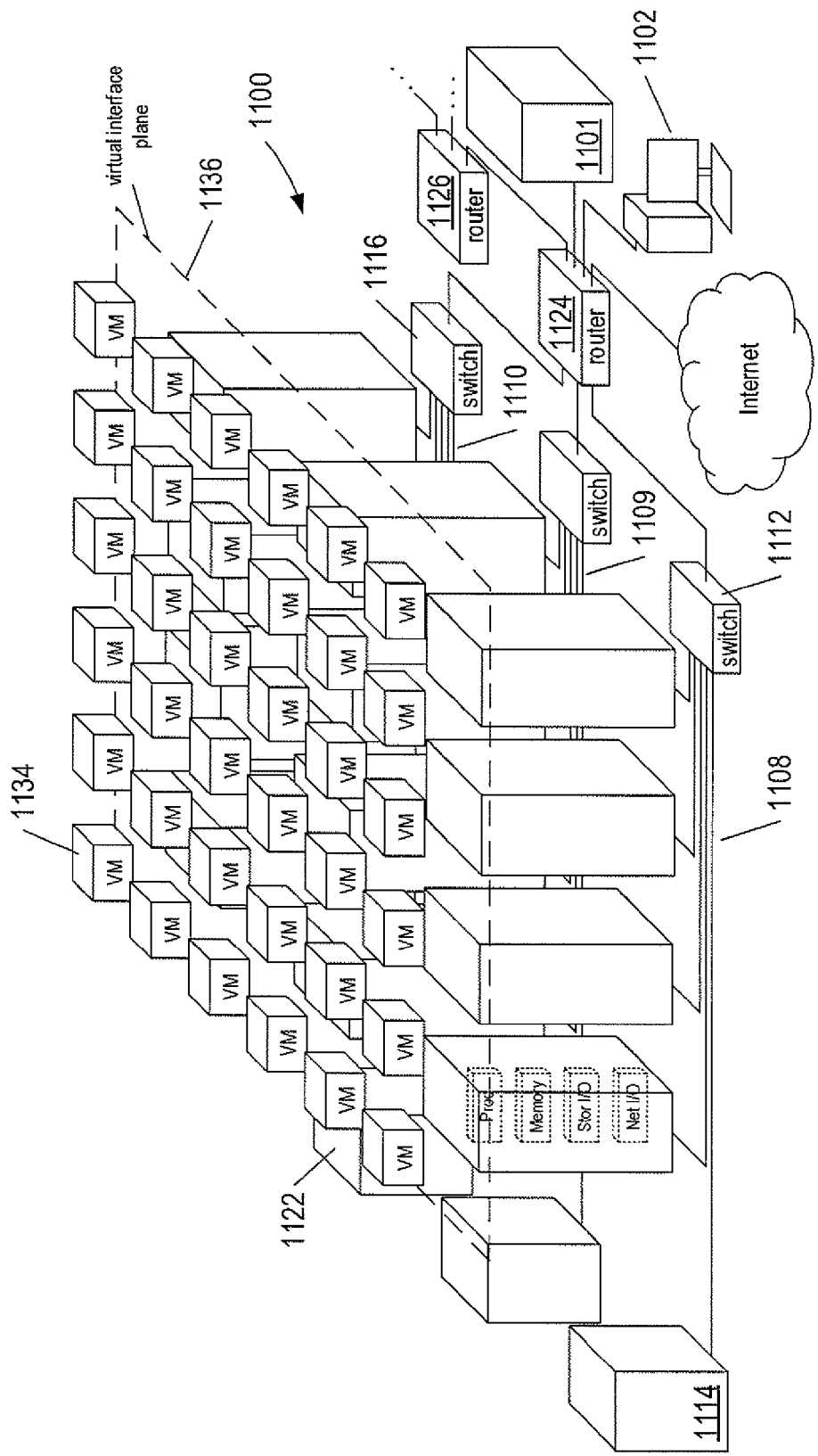

Methods and Systems that Allocate Cost of Cluster Resources in Virtual Data Centers FIG. 11 shows an example portion of a physical data center 1100 dedicated to serve as physical resources for a tenant's VDC. The physical data center 1100 consists of a virtual-data-center management server 1101 and a PC 1102 on which a virtual-data-center management interface may be displayed to system administrators and other users. The physical data center 1100 additionally includes a number of hosts or server computers, such as server computers 1104-1107, that are interconnected to form three local area networks 1108-1110. For example, local area network 1108 includes a switch 1112 that interconnects the four servers 1104-1107 and a mass-storage array 1114 via Ethernet or optical cables and local area network 1110 includes a switch 1116 that interconnects four servers 1118-1121 and a mass-storage array 1122 via Ethernet or optical cables. In this example, the physical data center 1100 also includes a first router 1124 that interconnects the LANs 1108-1110 and interconnects the LANS to the Internet, the virtual-data-center management server 1101, the PC 1102 and to a second router 1126 that, in turn, interconnects other LANs composed of server computers and mass-storage arrays (not shown). In other words, the routers 1124 and 1126 are interconnected to form a larger network of server computers. Each server computer consists of system resources. A system resource is any physical or virtual component with limited availability within a server computer. A server computer resource may be processors, memory, storage I/O, and network I/O. For example, server computer 1104 includes processors 1128, memory 1129, storage I/O 1130, and network I/O 1131. The server computers of the physical data center 1100 form a cluster of host computers for a tenant's VDC. FIG. 11B shows an example of a tenant's VDC consisting of thirty-six VMs, such as VM 1134, above a virtual interface plane 1136. The VMs run on the cluster of server computers.

Computational methods and systems now described are directed to computing a fair unit rate that, in turn, is used to fairly allocate cost of using a cluster between the cloud computing facility that maintains the cluster and the tenants that run their VMs on the cluster and may be used to provision the cluster resources in manner that optimizes use of the resources. Methods and systems allocate cost based on the following three conditions: (1) When some amount of the total capacity of a cluster resource is reserved to handle peak workloads, the fair unit rate charges the reserved capacity when the reserved capacity is not utilized. (2) The fair unit rate does not over allocate cost of the cluster. For example, at a point in time when VMs are utilizing the reserved capacity, the total cost of the VMs should not exceed the total cost of the cluster leading to over recovery of cost. (3) The fair unit rate should be useful for determining cost efficiency of provisioning cluster resources of the physical data center, which is possible with a measure of how much it cost for maintaining unutilized capacity.

Figure 12:
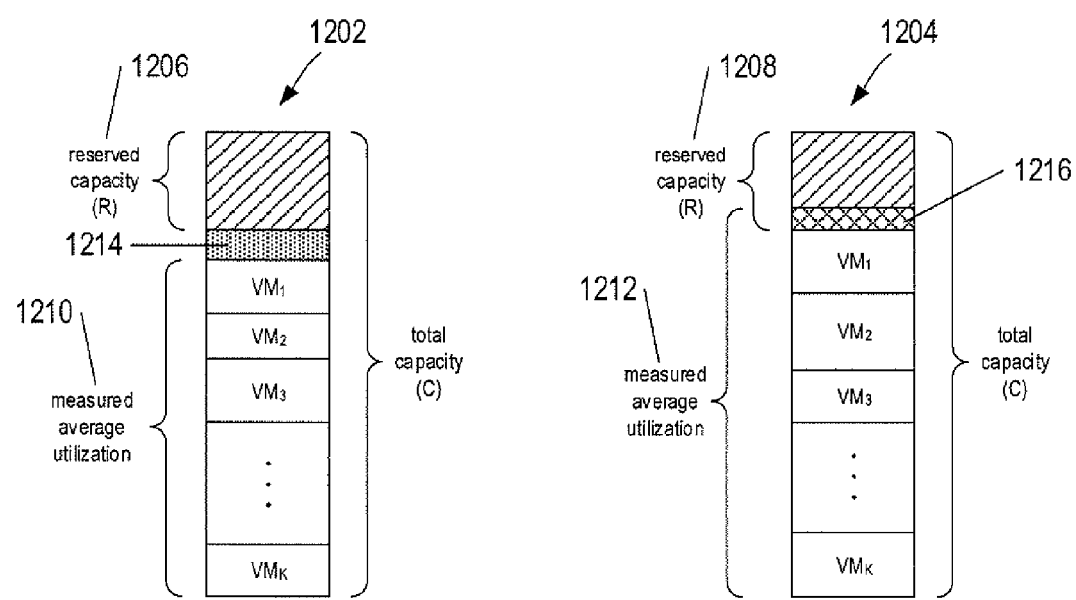
FIG. 12 shows examples of over-provisioning and under-provisioning a particular type of resource to virtual machines.

FIG. 12 shows examples of over-provisioning and under-provisioning a particular type of resource to K VMs running on a cluster of server computers, where K is an integer. The resource of a cluster, or cluster resource, may be, for example, the processors of the server computers comprising the cluster or the memory of the server computers comprising the cluster. Bar graph 1202 represents under-provisioning of a particular cluster resource to K VMs and bar graph 1204 represents over-provisioning of the cluster resource to the K VMs. The lengths of the bar graphs 1202 and 1204 represent the total capacity of a cluster resource across all of the server computers used to run the K VMs. The total capacity of a cluster resource, denoted by C, is computed as the sum total of the capacity of the resource across the computer servers that form the cluster. For example, suppose each of the twelve server computers of the physical data center 1100 shown in FIG. 11 has a 4.0 GHz processor and 64 GB of memory. The total capacity of the provision of the cluster is 48 GHz (i.e., 48=4.0×12) and the total capacity of the memory of the cluster is 768 GB (i.e., 768=64×12). The bar graphs 1202 and 1204 are divided into sections, the length of each section along the length of a bar graph represents a fraction of the total capacity of the cluster resource. The bar graphs 1202 and 1204 include reserved capacity sections 1206 and 1208 in order to handle peak workloads. Sections of the bar graphs 1202 and 1204 outside the reserved capacity sections 1206 and 1208 represent unreserved capacity for handling average or off-peak workloads. Measured average utilization sections 1210 and 1212 of the bar graphs 1202 and 1204, respectively, represent measured average utilization of the cluster resource by the K VMs over a period of time.

Figure 13:
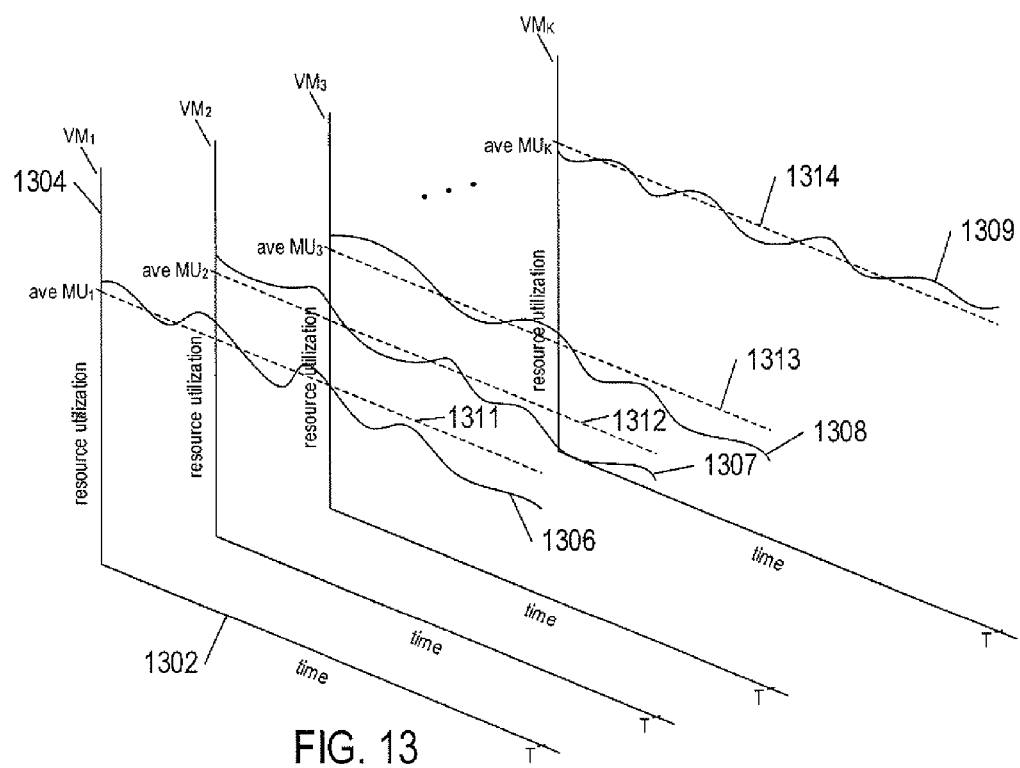
FIG. 13 shows an example series of cluster resource utilization plots over a period of time.

FIG. 13 shows an example series of cluster resource utilization plots over a period of time T for each of the K VMs. Each plot includes a time axis, such as time axis 1302, and a resource utilization axis, such as resource utilization axis 1304. Curves 1306-1309 represents measured utilization of a cluster resource by each of the K VMs over a period of time T. For example, curve 1306 represents measured utilization of the cluster resource by a particular VM, denoted by $VM_1$, over the period of time T. Because each VM is not restricted to using a single resource of a particular computer server over the period T, the measured utilization associated with each VM may be a measured utilization of the same type of resource across a number of server computers. For example, if the cluster resource are processors, the measured utilization curve 1306 may represent $VM_1$'s measured utilization of two or more processors of a number of different server computers of the cluster over the period of time T. Dashed lines 1311-1314 represent average measured utilization of the resource by each of the VMs over the period of time T. The average measured utilization of the cluster resource by the k-th $VM_k$ is denoted by $aveUM_k$. The average measured utilization of a resource by a VM may be determined by a VM monitoring tool. For example, dashed line 1311 represents average measured utilization of the cluster resource by VM1 denoted by $aveMU_1$.

Returning to FIG. 12, the length of each subsection of the measured average utilization sections 1210 and 1212 represent an average measured utilization of the cluster resource used by a particular VM calculated over the period. For example, the length of the sub-section labeled $VM_1$ represents the average utilization of the cluster resource by a VM over the period. The measured average utilization of the cluster resource by the K VMs is given by:

$$MAU = \sum_{k=1}^{K} aveMU_k \qquad (1)$$

In the case of over-provisioning represented by bar graph 1204, cross-hatched section 1216 represents a fraction of the reserved capacity 1212 used on average by the K VMs. In other words, the measured average utilization 1212 of the cluster resource over the period is greater than the unreserved capacity resulting in regular usage of the fraction 1216 of the reserved capacity 1208. A fair unit rate for computing cost allocation of a cluster resource in the case of over-provisioning is given by:

$$FUR = \frac{F}{MAU} \quad (2)$$

where F is the fully loaded cost of the cluster resource

The fully loaded cost of a resource is the actual cost of acquiring and maintaining the resource. For a simplistic example, consider a server purchased for $1000 based on a particular CPU model and memory capacity. Suppose the ratio of the respective market costs of the CPU and memory capacity is 4:1. Considering the CPU and memory only, the cost of the CPU resource is 800$ and the cost of the memory resource is 200$. Assuming the value of the server depreciates linearly over 3 years, the monthly cost of the CPU for this server will be $800/(3×12) and the monthly cost of the memory will be $200/(3×12). This is a simple fully loaded monthly cost arrived at by only considering the cost of the server. Similarly, the cost of the server may include additional factors, such as maintenance, labor, and real estate, that may also be divided into the cost of the server. The total cost of the CPU considering other input costs is termed the fully loaded cost of the CPU. Assuming a mechanism exists to distribute the actual cost of the servers in different dimensions to constituent resources, this cost per resource is a fully loaded cost.

On the other hand, in the case of under-provisioning represented by bar graph 1202, shaded section 1214 represents on average unutilized capacity over the period. In other words, the measured average utilization 1210 of the cluster resource over the period is less than the unreserved capacity, leaving unutilized capacity 1214. A fair unit rate for computing cost allocation of a cluster resource in the case of under-provisioning is given by:

$$FUR = \frac{F}{EU} \quad (3)$$

where EU=C−R is called an expected utilization with R equal to the reserved capacity for peak workloads.

Figure 14:
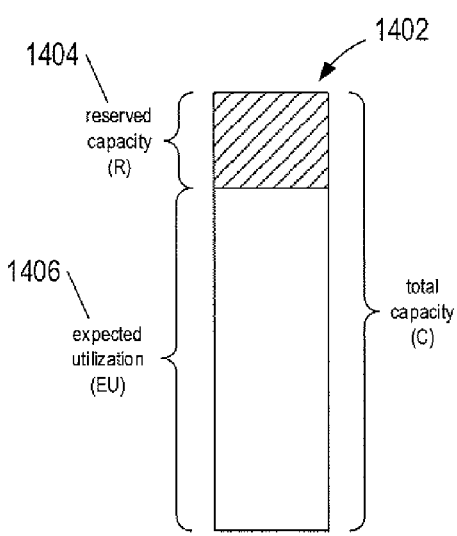
FIG. 14 shows an example bar graph of a total capacity of a cluster resource partitioned into a reserved capacity and a expected utilization to handle.

FIG. 14 shows an example bar graph 1402 of a total capacity C of a cluster resource partitioned into a reserved capacity to handle peak workloads and a defined expected utilization to handle. Section 1404 represents the fraction of the total capacity dedicated to the reserved capacity R and section 1406 represents the remaining fraction of the total capacity is the expected utilization of a cluster resource by the K VMs. The expected utilization 1406 may be the level of utilization an IT administrator of a physical data center assigns to run the cluster resource, leaving the reserved capacity 1404.

The allocated cost of running K VMs using a particular resource of cluster may be computed according to $$AllocatedCost = \sum_{k=1}^{K} VMCost_k = FUR \sum_{k=1}^{K} aveMU_k \quad (4)$$

where the fair unit rate is given by $$FUR = \frac{F}{Max(EU, MAU)} \quad (5)$$

The fair unit rate given by Equation (5) is computed based on the magnitudes of the expected utilization EU and the measured average utilization MAU. According to Equation (5), when the measured average utilization, MAU, of the K VMs is greater than the expected utilization, EU, the fair unit rate, FUR, is computed based on the measured average utilization MAU. On the other hand, when the measured average utilization, MAU, of the K VMs is less than the expected utilization, EU, the fair unit rate, FUR, is computed based on the expected utilization EU.

The unallocated cost that results from under-provisioning of cluster resources may be computed according to $$UnallocatedCost = F \times \frac{(EU - MAU)}{EU} \quad (6)$$

There is no unallocated cost when the cluster resource is over-provisioned. In other words, the unallocated cost is Unallocated Cost=0. The unallocated cost may be used to identify when cluster resources should be re-provisioned for the K VMs. For example, when UnallocatedCost>Th, where Th is a threshold used to indicate when cluster resource are being under-provisioned, an alert may be generated and the cluster resources may be re-provisioned in order to optimize use the cluster resource by the K VMs.

Figure 15A:
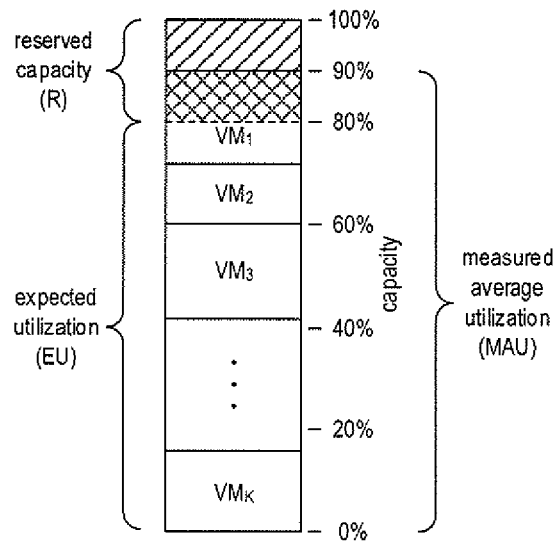
FIGS. 15A-15B show examples of cost allocation of processors of a cluster.
Figure 15B:
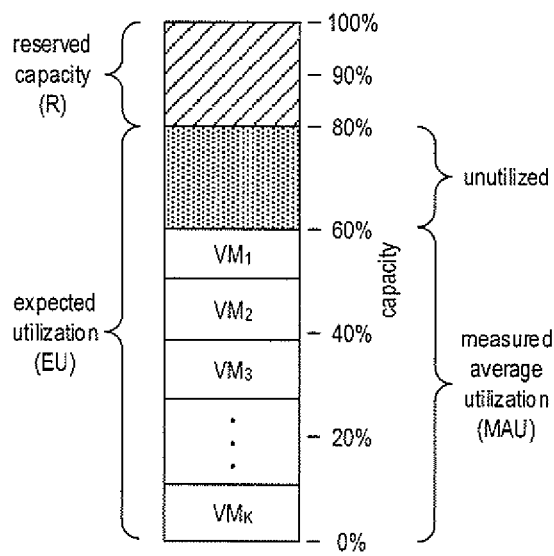

FIGS. 15A-15B show examples of cost allocation of processors of a cluster to K VMs. The processors have a collective capacity of 100 GHz with 20 GHz reserved for peak periods. With 20 GHz reserved for peak workloads, the expected utilization is 80 GHz (i.e., EU=80 GHz). The fully loaded cost of the processors is $2000 (i.e., F=$2000). As shown in FIG. 15A, the measured average utilization is 90% of the total capacity or 90 GHz. According to Equation (4), the fair unit rate for the processors is $$FUR = \frac{\$2000}{Max(80 \text{ GHz}, 90 \text{ GHz})} = \$22.22$$

And according to Equation (4) the allocated cost of the K VMs using the processors is AllocatedCost=$22.22×90 GHz=$1999.80

On the other hand, in FIG. 15B, the measured average utilization of the processors by K VMs is 60% of the total capacity or 60 GHz. According to Equation (4), the fair unit rate for the processors is $$\frac{\$2000}{Max(80 \text{ GHz}, 90 \text{ GHz})} = \$25.00$$

And according to Equation (4) the allocated cost of the K VMs using the processors is AllocatedCost=$25.00×60 GHz=$1500.00

The unallocated cost is computed according to Equation (6) to give $$UnallocatedCost = \$2000 \frac{(80-60)\text{Ghz}}{80\text{ GHz}} = \$500$$

Because the K VMs may actually use a different types of cluster resources (e.g., processors, memory, storage I/O, network I/O, etc.), the total allocated cost of the K VMs using M different types of resources of the cluster may be computed according to $$TotalAllocatedCost = \sum_{m=1}^{M} AllocatedCost_m \quad (7)$$

$$= \sum_{m=1}^{M} \sum_{k=1}^{K} VMCost_{mk} = \sum_{m=1}^{M} FUR_m \sum_{k=1}^{K} aveMU_{mk}$$

where
AllocatedCost$_m$ is the allocated cost of the K VMs uses of the m-th resource; VMCost$_{mk}$ is the cost of the k-th VM average utilization of the m-th resource;
aveMU$_{mk}$ is average measured utilization of the m-th resource by the k-th VM; and
the fair unit rate for the m-th resource of the cluster is given by $$FUR_m = \frac{F_m}{\text{Max}(EU_m, MAU_m)} \quad (8)$$

The unallocated cost of under-provisioned cluster resources is given by $$TotalUnallocatedCost = \sum_{m=1}^{M} UnallocatedCost_m \quad (9)$$

$$= \sum_{m=1}^{M} F_m \times \frac{(EU_m - MAU_m)}{EU_m}$$

where
UnallocatedCost$_m$ is the unallocated cost of the m-th resource;
F$_m$ is the fully loaded cost of the m-th resource;
EU$_m$ is the expected utilization of the m-th resource; and
MAU$_m$ is the measured average utilization of the m-th resource.

The unallocated cost of a resource is zero when the cluster resource is over-provisioned (i.e., Unallocated Cost$_m$=0). The total unallocated cost may be used to identify when cluster resources should be re-provisioned. For example, when TotalUnallocatedCost>Th$_{tot}$, where Th$_{tot}$ is a total unallocated cost threshold used to identify when a number of the cluster resources may be re-provisioned in order to optimize use of the cluster resource by the K VMs. The total unallocated cost threshold may be used to generate an alert that indicates when the cluster has been over-provisioned for the VMs.

Figure 16:
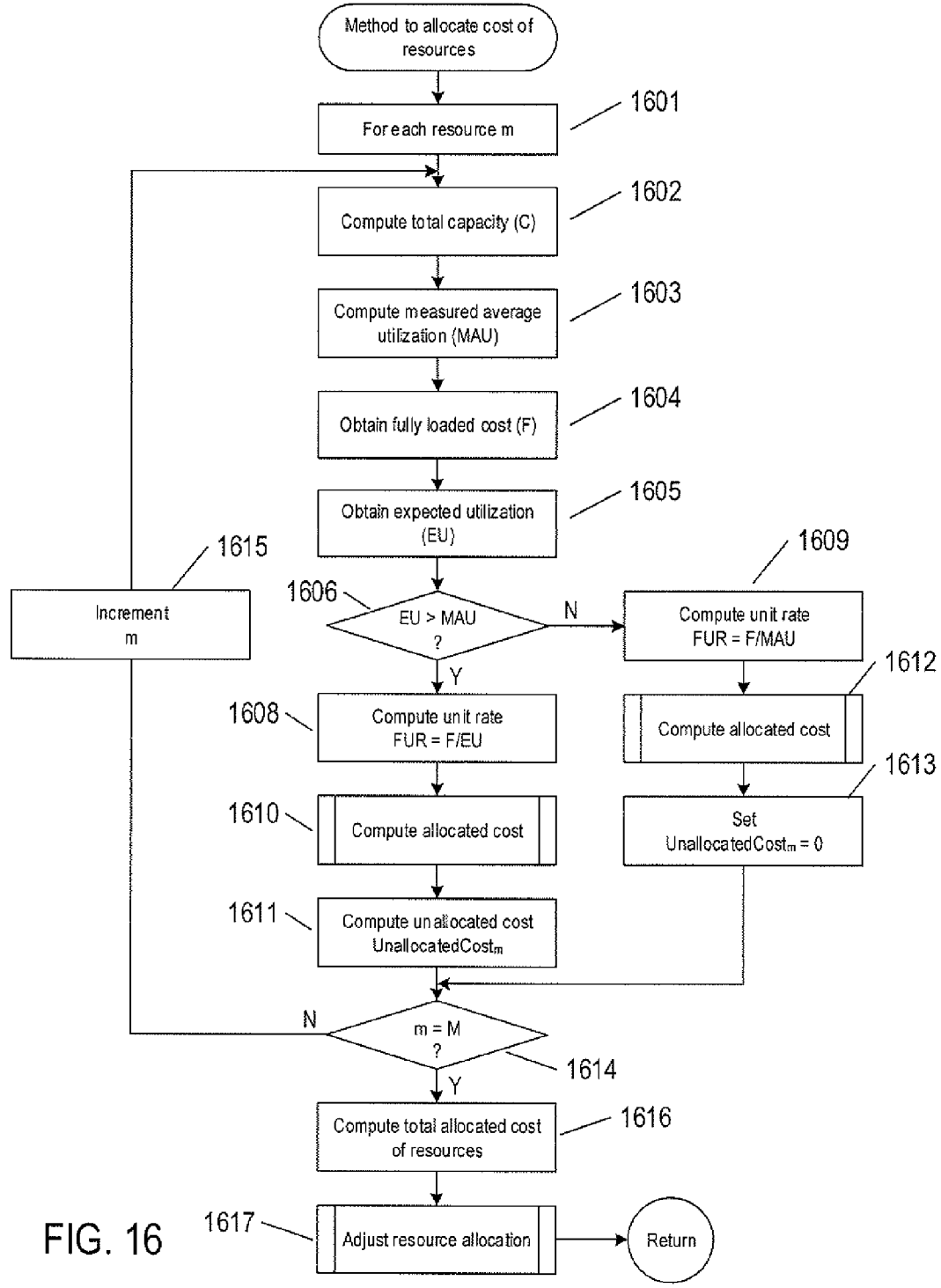
FIG. 16 shows a flow-control diagram of method to allocate cost of resources.

FIG. 16 shows a flow-control diagram of method to compute cost of resources. A for-loop beginning with block 1601 repeats the computation operations represented by blocks 1602-1614 for each resource of a cluster of server computers. In block 1602, the total capacity of the cluster resource is computed. For example, when the cluster resource are the processors of the server computers comprising the cluster, the total capacity may be calculated as a sum of processor speeds of the processors. When the cluster resource is the memory of the server computers comprising the cluster, the total capacity may be calculated as a sum of the amount of memory of each server computer comprising the cluster. In block 1603, a measured average utilization MAU is computed as described above with reference to FIG. 13 and Equation (1). In block 1604, fully loaded cost F of the resource is obtained. For example, the resource cost of the cluster may be compute as the sum of depreciated resource of all server computers comprising the cluster. In block 1605, an expected utilization EU may be obtained as described above with reference to FIG. 14 as the different between the total capacity of the resource of the cluster and a reserved capacity of the resource for peak workloads. In decision block 1606, the denominator of the fair unit is determined as described above with reference to Equation (5). When the expected utilization EU is greater than the measured average utilization MAU, control flows to block 1608. Otherwise, when the expected utilization is less the measured average utilization MAU, control flows to block 1609. In block 1608, a fair unit rate is computed as described above with reference to Equation (6). In block 1610, a routine "compute allocated cost" is called to compute an allocated cost for the cluster resource as described below with reference to FIG. 17. In block 1611, an unallocated cost is computed as described below with reference to Equation (6). In block 1612, the routine "compute allocated cost" is also called after the operation represented by block 1609. In block 1613, the unallocated cost associated with the cluster resource assign the value zero, because the measured average utilization MAU is greater than the expected utilization EU there is no un-utilized portion of the total capacity, as described above with reference to the example represented in FIG. 15A. In decision block 1614, when m is equal to the number of different types of resources M, control flows to block 1616. Otherwise, when m does not equal to M, control flows to block 1615 in which the value m is incremented. In block 1616, total allocated cost of the resources of cluster is computed as described above with reference to Equation (7). In block 1617, a routine "adjust resource allocation" is called in block 1617.

Figure 17:
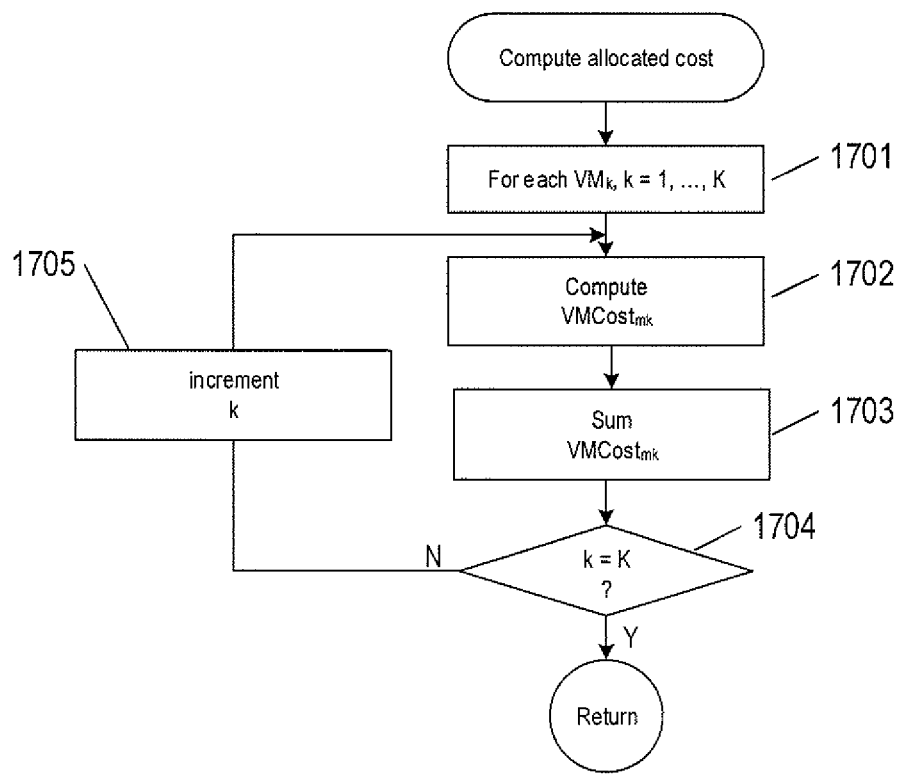
FIG. 17 shows a flow-control diagram of a routine "compute allocated cost" called in blocks of FIG. 16.

FIG. 17 shows a flow-control diagram of the routine "compute allocated cost" called in blocks 1610 and 1612 of FIG. 16. A for-loop beginning with block 1701 repeats the computational operations represented by blocks 1702-1705 for each of the K VMs. In block 1702, cost of VM is computed as VMCost$_{mk}$=FUR$_m$×aveMU$_{mk}$. In block 1703, cost of the VMs are summed as described above with reference to Equations (4) and (7). In decision block 1704, when the VM index k does not equal K, control flows to block 1705, in which k is incremented and blocks 1702 and 1703 are repeated. Otherwise, the routine terminates and returns.

Figure 18:
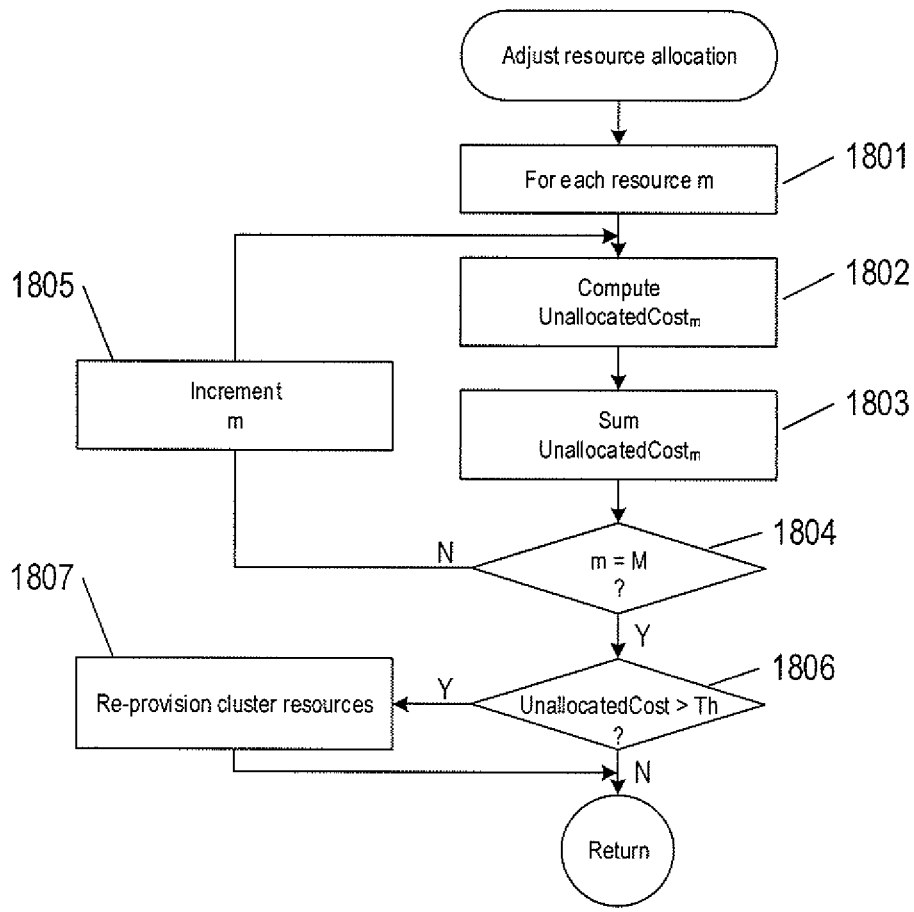
FIG. 18 shows a flow-control diagram of a routine "adjust resource allocation" called in a block of FIG. 16.

FIG. 18 shows a flow-control diagram of the routine "adjust resource allocation" called in block 1617 of FIG. 16. A for-loop beginning with block 1801 repeats the computational operations represented by blocks 1802-1805. In block 1802, unallocated cost associated with unused portions of the total capacity of the cluster resource are computed as described above with reference to Equation (6). In block 1803, the unallocated cost are summed as described above with reference to Equation (9). In block 1804, when m not equal M, control flows to block 1805 in which m is incremented. Otherwise, control flows to decision block 1806. In decision block 1806, the total unallocated cost resulting from the for-loop of blocks 1801-1805 is compared with an unallocated cost threshold. When the total unallocated cost is greater than the threshold, the cluster has been over-provisioned for the VMs and control flows block 1807. In block 1807, the cluster is re-provisioned in order to reduce the number of unused cluster resources.

It is appreciated that the various implementations described herein are intended to enable any person skilled in the art to make or use the present disclosure. Various modifications to these implementations will be readily apparent to those skilled in the art, and the generic principles defined herein may be applied to other implementations without departing from the spirit or scope of the disclosure. For example, any of a variety of different implementations can be obtained by varying any of many different design and development parameters, including programming language, underlying operating system, modular organization, control structures, data structures, and other such design and development parameters. Thus, the present disclosure is not intended to be limited to the implementations described herein but is to be accorded the widest scope consistent with the principles and novel features disclosed herein.

The invention claimed is:

1. A method that uses a programmable computer programmed to allocate cost of cluster resources of a cluster of server computers, the method comprising:
   computing a measured average utilization of a cluster resource of the cluster of server computers within a physical data center by a number of virtual machines;
   computing an expected utilization of the cluster resource based on a total capacity of the cluster resource and a reserved capacity of the cluster resource;
   computing a fair unit rate based on a fully loaded cost of the cluster resource and maximum of one of the expected utilization and the measured average utilization;
   computing an allocated cost of the utilization of the cluster resource by the virtual machines based on the fair unit rate and each virtual machines utilization of the cluster resource;
   computing an unallocated cost of the cluster resource based on the measured average utilization and the expected utilization of the cluster resource; and
   re-provisioning the cluster resource for the virtual machines when the unallocated cost is greater than a threshold in order to optimize use of the cluster resource within the physical data center.

2. The method of claim 1 wherein computing the unallocated cost of the cluster resource comprises computing the unallocated cost of the cluster resource when the measured average utilization is less than the expected utilization based on the fully loaded cost of the cluster resource, expected utilization and difference between the expected utilization and the measured average utilization.

3. The method of claim 1 wherein computing the measured average utilization further comprises:
   measuring utilization of the cluster resource by each of the virtual machines over the period of time;
   computing an average measured utilization of the cluster resource by each of the virtual machines over the period of time; and
   summing the average measured utilization to generate the measured average utilization of the cluster resource.

4. The method of claim 1 wherein the expected utilization is the difference between the total capacity of the cluster resource and a reserved capacity of cluster resource.

5. The method of claim 1 further comprises repeating the operations of computing the measured average utilization, computing the expected utilization, computing the fair unit rate, computing the allocated cost for each cluster resource of the cluster of server computers and summing the allocated cost to generate a total allocated cost of cluster resources.

6. A computer system comprising:
   one or more processors:
   one or more data-storage devices; and
   a routine stored in the data-storage devices and executed using the one or more processors, the routine
   computing a measured average utilization of a cluster resource of a cluster of server computers within a physical data center by a number of virtual machines;
   computing an expected utilization of the cluster resource based on a total capacity of the cluster resource and a reserved capacity of the cluster resource;
   computing a fair unit rate based on a fully loaded cost of the cluster resource and maximum of one of the expected utilization and the measured average utilization;
   computing an allocated cost of the utilization of the cluster resource by the virtual machines based on the fair unit rate and each virtual machines utilization of the cluster resource;
   computing an unallocated cost of the cluster resource based on the measured average utilization and the expected utilization of the cluster resource; and
   re-provisioning the cluster resource for the virtual machines when the unallocated cost is greater than a threshold in order to optimize use of the cluster resource within the physical data center.

7. The computer system of claim 6 wherein computing the unallocated cost of the cluster resource comprises computing the unallocated cost of the cluster resource when the measured average utilization is less than the expected utilization based on the fully loaded cost of the cluster resource, expected utilization and difference between the expected utilization and the measured average utilization.

8. The computer system of claim 6 wherein computing the measured average utilization further comprises:
   measuring utilization of the cluster resource by each of the virtual machines over the period of time;
   computing an average measured utilization of the cluster resource by each of the virtual machines over the period of time; and
   summing the average measured utilization to generate the measured average utilization of the cluster resource.

9. The computer system of claim 6 wherein the expected utilization is the difference between the total capacity of the cluster resource and a reserved capacity of cluster resource.

10. The computer system of claim 6 further comprises repeating the operations of computing the measured average utilization, computing the expected utilization, computing the fair unit rate, computing the allocated cost for each cluster resource of the cluster of server computers and summing the allocated cost to generate a total allocated cost of cluster resources.

11. A non-transitory computer-readable medium encoded with machine-readable instructions that implement a method carried out by one or more processors of a computer system to perform the operations of computing a measured average utilization of a cluster resource of a cluster of server computers within a physical data center by a number of virtual machines;
- computing an expected utilization of the cluster resource based on a total capacity of the cluster resource and a reserved capacity of the cluster resource;
- computing a fair unit rate based on a fully loaded cost of the cluster resource and maximum of one of the expected utilization and the measured average utilization;
- computing an allocated cost of the utilization of the cluster resource by the virtual machines based on the fair unit rate and each virtual machines utilization of the cluster resource;
- computing an unallocated cost of the cluster resource based on the measured average utilization and the expected utilization of the cluster resource; and
- re-provisioning the cluster resource for the virtual machines when the unallocated cost is greater than a threshold in order to optimize use of the cluster resource within the physical data center.

12. The medium of claim 11 wherein computing the unallocated cost of the cluster resource comprises computing the unallocated cost of the cluster resource when the measured average utilization is less than the expected utilization based on the fully loaded cost of the cluster resource, expected utilization and difference between the expected utilization and the measured average utilization.

13. The medium of claim 11 wherein computing the measured average utilization further comprises:
- measuring utilization of the cluster resource by each of the virtual machines over the period of time;
- computing an average measured utilization of the cluster resource by each of the virtual machines over the period of time; and
- summing the average measured utilization to generate the measured average utilization of the cluster resource.

14. The medium of claim 11 wherein the expected utilization is the difference between the total capacity of the cluster resource and a reserved capacity of cluster resource.

15. The medium of claim 11 further comprises repeating the operations of computing the measured average utilization, computing the expected utilization, computing the fair unit rate, computing the allocated cost for each cluster resource of the cluster of server computers and summing the allocated cost to generate a total allocated cost of cluster resources.

* * * * *